Sept. 13, 1966    L. J. GOLDBERG    3,273,018
FAST ACTION CURRENT LIMITING CIRCUIT EMPLOYING RELEASE
OF STORED ENERGY TO INITIATE CURRENT LIMITING ACTION
Filed Sept. 15, 1964    6 Sheets-Sheet 1
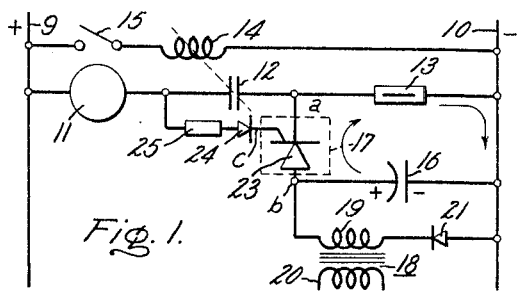
Fig. 1.
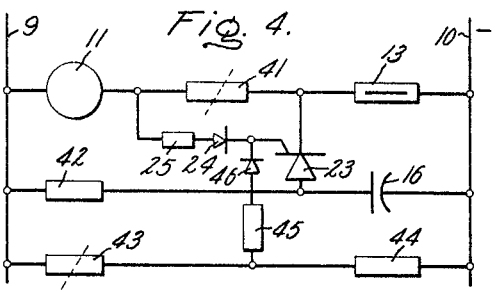
Fig. 4.
Fig. 2.
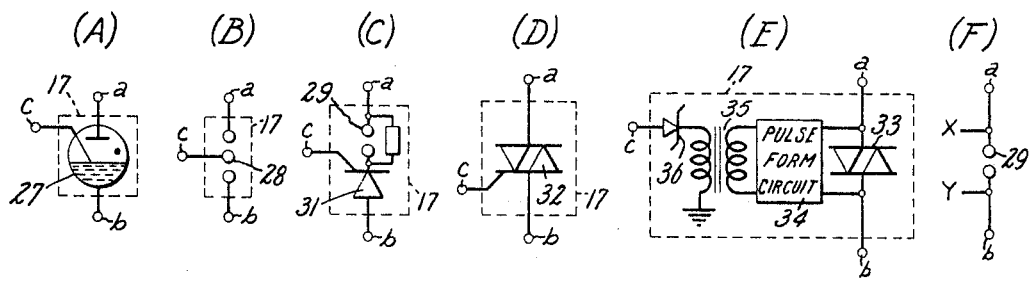
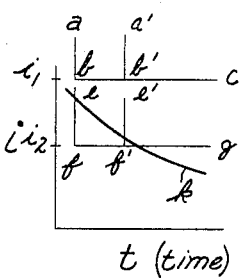
Fig. 3.
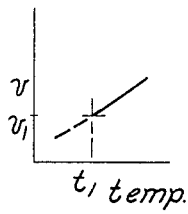
Fig. 5.
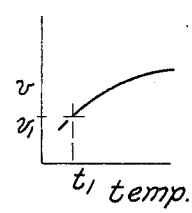
Fig. 6.
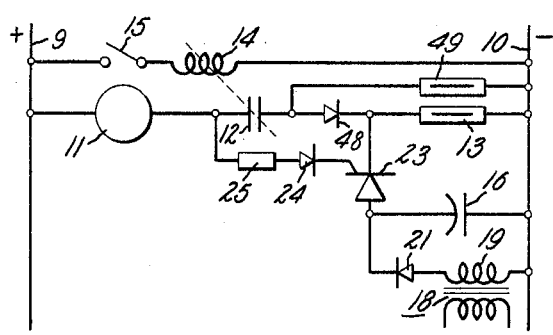
Fig. 7.
Inventor:
Leon J. Goldberg,
by Charles W Helzer
His Attorney.

Inventor:
Leon J. Goldberg
by Charles W Helzer
His Attorney.

Inventor:
Leon J. Goldberg.
by Charles W Heher
His Attorney.

Sept. 13, 1966 L. J. GOLDBERG 3,273,018
FAST ACTION CURRENT LIMITING CIRCUIT EMPLOYING RELEASE
OF STORED ENERGY TO INITIATE CURRENT LIMITING ACTION
Filed Sept. 15, 1964 6 Sheets-Sheet 6

Inventor:
Leon J. Goldberg,
by Charles W Helzer
His Attorney.

United States Patent Office 3,273,018
Patented Sept. 13, 1966

3,273,018
FAST ACTION CURRENT LIMITING CIRCUIT EMPLOYING RELEASE OF STORED ENERGY TO INITIATE CURRENT LIMITING ACTION
Leon Joseph Goldberg, Schenectady, N.Y., assignor to General Electric Company, a corporation of New York
Filed Sept. 15, 1964, Ser. No. 397,365
24 Claims. (Cl. 317—20)

The present invention relates to fast-acting current limiting power circuits.

More particularly, the invention relates to fast-acting current limiting and interrupting power circuits capable of limiting current flow through a load from a power supply within microseconds after detection of a fault, and subsequently interrupting the current.

With the increasing use of semiconductor devices in power circuitry, as well as other devices readily damaged when exposed to overcurrents for any prolonged period, it has bceome increasingly important to provide improved fast acting protective measures in power circuits employing such devices. To be particular, it is desirable that the protective circuit detect, signal the existence of, and limit fault currents before they develop high damage capability, and also, where applicable, the protective circuitry should interrupt the fault current. It is also desirable that such circuitry be capable of repetitive operation over a useful life period, and that it be applicable to either direct current or alternating current circuits of commercial power ratings, particularly those of substantial size at higher voltages. In addition to these featuers, it would be desirable that the protective circuitry be capable of protecting each of the supply lines of a polyphase power supply upon the occurrence of a fault in anyone of the lines, or that it operate protective measures in any one single phase line or in all phases from a selected control signal other than overcurrent.

It is therefore a primary object of the present invention to provide a fast-acting current limiting protective circuit which is capable of detecting, signaling, and limiting fault currents in power circuits before they develop high damage capability.

A further object of the invention is to provide a fast-acting current limiting protective circuit having the above characteristics, which is also capable of fast-action interruption of the fault current.

Still another object of the invention is the provision of fast-acting current limiting and interrupting protective circuits which are capable of repetitive operation over a useful lifetime and may be applied to either alternating current or direct current power circuits.

A still further object of the invention is the provision of new and improved fast-acting current limiting and interrupting power circuits which when employed in polyphase systems can limit and interrupt current through each line of the polyphase system upon the occurrence of a fault in any one or all of the lines, and which can be made to initiate operation of any one or all of the fast-acting current limiting-interrupting circuits in any one or all of the single phase lines from arbitrary signal sources, or from fault currents occurring in the polyphase power supply system.

In practicing the invention a fast-action current limiting circuit is provided which includes a load to be protected connected in series circuit relationship with a current limiting means across a pair of power supply terminals. A commutating capacitor and fast-acting conductivity controlled conducting means are connected in series circuit relationship across the current limiting means, and means are provided for charging the commutating capacitor to a predetermined voltage level. Sensing means are operatively connected in circuit relationship with the load for sensing the load current flow through the load and deriving a signal upon the load current assuming an undesired load current condition that can be used to initiate a subsequent operation. To complete the circuit, means are provided for operatively coupling the output of the sensing means to the fast-acting conductivity controlled conducting means for causing the fast-acting conducting means to turn on thereby discharging the commutating capacitor through the current limiting means to initiate its current limiting action.

In one particular form of the invention, in addition to the above recited structure, a set of current interrupting physically separable contacts are connected in series circuit relationship with the load to be protected and the current limiting means. If desired, a second commutating capacitor and fast-acting gate controlled conducting device can be connected across the set of current interrupting physically separable contacts for achieving arcless interruption of the current flow through the load. Further, for those applications where it is desired to protect a three-phase power circuit, the new and improved fast-acting current limiting and interrupting circuit arrangements can be adapted to provide for fast-acting current limiting and interruption of all three of the single phase power lines in response to the sensing of an overcurrent or other undesired current condition in any one or all of the single lines.

Other objects, meatures, and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a schematic circuit diagram of a new and improved fast-acting current limiting power circuit constructed in accordance with the present invention;

FIGURE 2 is a series of schematic illustrations of alternative conductivity controlled conducting means that can be employed in the circuit configuration of FIGURE 1, as well as in other circuit configurations disclosed hereinafter;

FIGURE 3 is a characteristic curve illustrating the manner of operation of the circuit of FIGURE 1;

FIGURE 4 is an alternative form of fast-acting current limiting power circuit constructed in accordance with the invention which provides inverse time overcurrent protection;

FIGURE 5 is a voltage versus time characteristic curve illustrating one manner of operation of the circuit of FIGURE 4;

FIGURE 6 is a voltage versus time characteristic curve illustrating a second mode of operation for the circuit of FIGURE 4.

FIGURE 7 is a schematic circuit diagram of a form of fast-acting current limiting circuit constructed in accordance with the invention wherein smaller components might be employed in a circuit of given power rating than would be otherwise possible with the circuit configuration of FIGURE 1;

Figure 14:
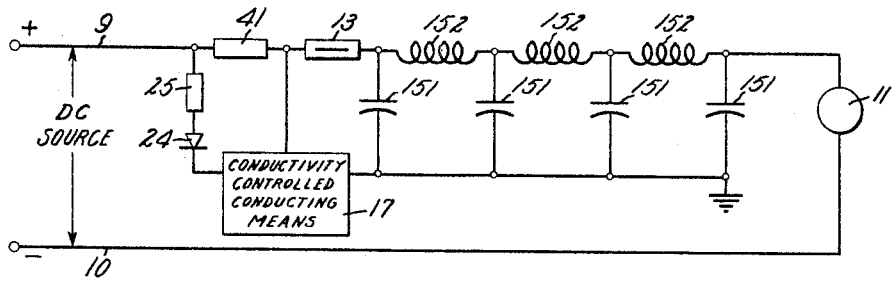
Figure 15:
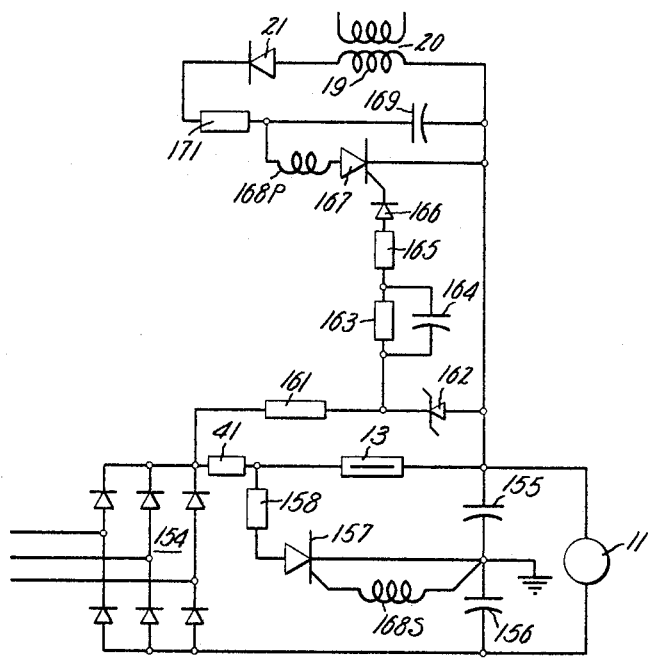

FIGURE 14 illustrates a form of the new and improved fast-acting current limiting circuit wherein the distributed capacitance of a power supply cable is employed as the commutating capacitor element; and FIGURE 15 illustrates a form of the new and improved fast-acting current limiting circuit designed for use with a three-phrase alternating current power supply wherein the distributed capacitance of a power supply cable is employed as the commutating capacitor element of the circuit.

The new and improved fast-action current limiting and interrupting circuit shown in FIGURE 1 of the drawings is comprised by a load 11, a set of current interrupting physically separable contacts 12, and a current limiting means 13, all connected in series circuit relationship across a pair of power supply terminals 9 and 10 that in turn are adapted to be connected to a source of direct current electric potential having the polarity indicated where 9 is the positive supply terminal and 10 is the negative terminal. The current limiting means 13 preferably comprises a metallic change of state current limiting device such as the circuit protective device disclosed in United States Patent No. 3,117,203 issued January 7, 1964, entitled "Circuit Protective Device and Circuits," R. L. Hurtle, inventor, assigned to the General Electric Company, assignee of the present invention. Alternatively, if the current limiting interrupter is not intended for repetitive use, but only a one shot operation is needed, it is possible to use a conventional fusible link as the current limiting means 13. One example of such a fusible link would be the small NEC type 600 volt fuses which are approximately 1⅝₁₆ inches long and consist of an open fusible wire supported within a ⅜ inch fiber tube. If desired, the current limiting means 13 may also comprise a solid-state conductor which is made of material having a strong positive coefficient of resistivity with change in temperature. One such solid-state conductor is manufactured and sold by the Carborundum Company as positive temperature thermistors under the tradename "PTC" resistors. These positive temperature thermistors are described in journals published by the Carborundum Company entitled "Advance Materials Technology," Fall issue 1961, and "Technical Bulletin GR3" both of which described these devices. One particular solid-state conductor suitable for use as the current limiting means 13 which is sold by the Carborundum Company as a positive temperature thermistor is identified under Catalog No. D1406P-1, and is about four-hundredths of an inch in length by three-sixteenths of an inch in diameter with wire terminals having soft solder metals sprayed on the end. These units carry nominal ratings of 22 ohms±20% at 90° centigrade, and have the equivalent of 11.9% increase in resistance per degree centigrade in the range of 100° centigrade to 135° centigrade. Another possible form of the current limiting means 13 would be a magnetic current limiting device wherein the magnetic reactor would be fabricated from a core material having a hysteresis loop which was nearly rectangular. Such an approach is not preferred, however, since the fabrication of such a magnetic current limiter is considerably more expensive than the other devices mentioned above.

The current interrupter 12 may comprise any conventional fast-acting circuit breaker or contactor preferably of the solenoid actuated type whose solenoid field winding 14 is energized upon closure of an on-off switch 15 connected in series circuit relationship with the winding 14 across the power supply terminals 9 and 10. Since the interrupter 12 is being used in a system which prevents the flow of high fault currents, either upon closing of the interrupter contacts or after the circuit has closed, an interrupter 12 having a contactor type of rating can be employed. It is also possible, as will be described more fully hereinafter in connection with FIGURE 9, as well as others, to employ an arcless interrupter in an arrangement such as shown in FIGURE 1 thereby providing for a system having the combined advantages of restricting damage to insulation by preventing large fault currents, and providing a long-lived compact interrupter without requiring the use of arc chutes, arc horns, air blasts, or other similar accessory equipment normally required for high voltage-high current interruption.

The current limiting means 13 has a commutating capacitor 16 and a fast-acting conductivity controlled conducting means 17 connected in series circuit relationship across it. The term "commutating capacitor" is used in the present text to identify the capacitor that is suddenly discharged through a current limiting device or fusible link to achieve a current limiting or interruption function. While this does not constitute commutation in the accepted sense of that term, it is believed that the function performed is sufficiently analogous to the commutation function to justify its usage in this manner. The commutating capacitor 16 is provided with a means for charging the commutating capacitor to a predetermined voltage level. In the embodiment of the invention shown in FIGURE 1, the means for charging the commutating capacitor 16 comprises a transformer 18 having its secondary winding 19 connected in series circuit relationship with a rectifying diode 21 across the commutating capacitor 16. The primary winding 20 of transformer 18 is connected to a suitable source of alternating current potential having an appropriate voltage rating for charging the commutating capacitor 16 to a predetermined voltage level. As will be disclosed later in connection with the circuit of FIGURE 4, other means for charging the commutating capacitor 16 may be provided.

In the form of the invention shown in FIGURE 1, the conductivity controlled conducting means 17 comprises a conventional gate controlled silicon controlled rectifier device 23 having its emitter connected to the juncture point (a) intermediate the limiter 13 and separable contacts 12, and having its collector electrode connected to the junction point (b) intermediate one plate of the commutating capacitor 16 and the secondary winding 19 of charging transformer 18. The control gate of the SCR 23 is connected to a sensing circuit means comprised by a blocking diode 24 and limiting resistor 25 connected in series circuit relationship between the terminal point (c) and the juncture of the load 11 with the set of physically separable interrupting contacts 12.

In placing the circuit of FIGURE 1 in operation, it is assumed that the charging means comprised by transformer 18 and rectifier 21 will charge the commutating capacitor 16 to the polarity indicated so that the plate connected to the point (b) is positive with respect to its opposite plate. Upon the circuit being placed in this condition, it is ready to initiate current flow through the load 11 by closure of the interrupter contacts 12. In the event that load current is already being supplied to the load 11, then limiting of the load current flow can then be achieved upon opening of the interrupter contacts 12 through appropriate actuation of the on-off switch 15. When the interrupter contacts 12 are being opened, a small arc will tend to form across these contacts which will produce a voltage drop. This voltage drop is sensed by the sensing circuit means comprised by limiting resistor 25 and blocking diode 24, and is applied to the control gate of SCR 23 to turn it on. Upon SCR 23 being gated on, the charge on the commutating capacitor 16 will be circulated through the now conducting SCR 23 and through the current limiting means 13. The current limiting means 13 preferably comprises a Hurtle limiter such as is described in the above-identified U.S. Patent No. 3,117,203, which, upon the current through the device rising above a predetermined critical level, converts liquid mercury to gaseous mercury thereby raising its resistance to current flow by several orders of magnitude almost instantaneously. As a consequence, the arc current normally associated with the opening of interrupter contacts 12 will be greatly limited by this considerable increase in resistance in the current limiting device 13. Since the SCR 23 is a fast-acting conducting device, discharge of the commutating capacitor 16 through the limiter 13 to cause it to be converted to its high resistance condition, occurs almost instantaneously. As a matter of fact, it has been empirically determined that current limiting can be achieved in a matter of 2 or 3 microseconds after sensing of the voltage rise across the opening contacts 12. Hence, it can be appreciated that the circuit operates to provide extremely fast-action current limiting which substantially prevents the flow of any sustained potentially injurious arc current through the circuit in which the current limiter is employed.

FIGURE 2 illustrates a number of different forms of the fast-acting conductivity controlled conducting means 17 that may be readily substituted for the silicon controlled rectifier device 23 employed in the circuit arrangement of FIGURE 1. For example, FIGURE 2A illustrates an ignition device 27 which could be operatively substituted in place of the SCR 23 by connection of its cathode to the point ($a$), the anode to the point ($b$), and the striking or gating electrode to the point ($c$) in the circuit arrangement of FIGURE 1.

FIGURE 2B illustrates a three-electrode gap 28 which could be operatively substituted in place of the SCR 23 used in the circuit arrangement of FIGURE 1 with very little modification. This could be accomplished by connecting one of the outer three electrodes to the point ($a$), the remaining outer electrode to the point ($b$), and the control electrode to the point ($c$).

FIGURE 2C illustrates an arrangement comprised by a two-electrode gap 29 and a silicon controlled rectifier 31 connected in series circuit relationship. The series circuit thus comprised could be inserted in place of the larger rated SCR 23 shown in the circuit arrangement of FIGURE 1 by connection of one electrode of gap 29 to the point ($a$), the collector electrode of SCR 31 to the point ($b$), and the control gate of SCR 31 to the point ($c$) in the circuit arrangement of FIGURE 1.

FIGURE 2D of the drawings illustrates a triac bidirectional conducting device 32 which may be suitably inserted in place of the SCR 23 used in the circuit arrangement of FIGURE 1. The gate controlled triac bidirectional conducting device 32 is a gate turn-on, non gate-turn-off bidirectional conducting device which has recently been introduced into the electrical industry by the Rectifier Components Department of the General Electric Company, Auburn, New York, Similar to the conventional SCR, the triac may be switched from a high impedance blocking state to a low impedance conducting state when a low voltage gate signal is applied between the gate terminal and one of its load terminals. Also, like the SCR, once the triac is switched to its low impedance conducting state, the gate electrode thereafter loses control and current flow through the device must be stopped by reversal of the polarity of the potentials across the device or reduction of source current to less than a small characteristic value called holding current. Unlike the SCR, however, a further characteristic of the triac 22 is that once it is gated on, it will conduct current through the device in either direction depending upon the polarity of the potentials applied across the load terminals of the device. For a more detailed description of the triac gate turn-on, non-gate turn-off solid-state semiconductor device, reference is made to Application Note 200.35 issued February 1964, entitled "Triac Control for A.-C. Power" by E. K. Howell, published by the Rectifier Components Department of the General Electric Company located in Auburn, New York.

FIGURE 2E of the drawings illustrates still another suitable form of fast-acting conductivity controlled conducting device that may be inserted into the circuit arrangement of FIGURE 1 in place of the SCR 23. The fast-acting conductivity controlled conducting means 17 shown in FIGURE 2E is comprised by a diac bidirectional conducting device 33 having its load terminals connected to each of the terminal points ($a$) and ($b$) in the circuit of FIGURE 1. The diac bidirectional conducting device 33 is an avalanche operated device which may be triggered to its "on" condition by the application of a sharp voltage rise across its load terminals. For this purpose, the diac device 33 has its load terminals connected across the output of a pulse forming network 34 whose input is supplied from a pulse transformer 35 having its primary winding connected through a zener or avalanche diode device 36 to the sensing circuit comprised by blocking diode 24 and limiting resistor 25. By this arrangement, when the voltage across the separating contacts 12 rises sufficiently, the zener or avalanche diode 36 will break down and conduct. This will produced a voltage pulse in pulse transformer 35 that is amplified by amplifier 34 and applied across the load terminals of diac device 33. This results in causing diac device 33 to break down and conduct current in a direction depending upon the polarity of the potentials across the device. For a more detailed description of the nature of the diac device 33, reference is made to an article entitled "Two-Terminal Asymmetrical and Symmetrical Silicon Negative Resistance Switches" by R. W. Aldrich and N. Holonyak, Jr., appearing in the Journal of Applied Physics, vol. 30, No. 11, November 1959, pages 1819–1824. FIGURE 2F of the drawings shows an alternative connection for the fast-acting conductivity controlled conducting means 17 shown in FIGURE 2E. By this alternative connection, a two-electrode gap 29 would be inserted in place of the diac bidirectional conducting device 33 in the arrangement of FIGURE 2E.

From the foregoing description, it can be appreciated that the fast-acting conductivity controlled conducting means 17 may take many forms provided that the means is capable of obtaining a fast discharge of the commutating capacitor 16 through the current limiting means 13 to thereby change it from its low resistance to its high resistance state in a very short period of time. A typical current versus time operating characteristic of a fast-acting current limiting circuit constructed in the manner shown in FIGURE 1 of the drawings is illustrated in FIGURE 3. The curve $k$ in FIGURE 3 represents the normal inverse time-current characteristic of a fusible element, or other device such as a bimetal element operated in a conventional fashion. The characteristic obtained for the current limiting means 13 in accordance with the invention as illustrated by FIGURE 1, is depicted by either curves $abc$, $a'b'c$, or $efg$ or $e'f'g$. The characteristic of $abc$ or $efg$ would be obtained by charging the commutating capacitor 16 with an amount of stored energy which is somewhat greater than that required to convert the metallic change of state limiting device 13 (assuming that that particular type of device is used), or to melt the fusible link. For the same amount of stored energy, if a lower voltage were used, such as by placing a resistor in series with the commutating capacitor 16, the firing time would be delayed as illustrated by the curve $a'b'c$ or $e'f'g$. The selection of what load current such as $i_1$ or $i_2$ in FIGURE 3, would cause the current limiting means 13 to fire, would be made by the calibration of the fast-acting conductivity controlled conducting means 17 with respect to the sensing circuit means connected across the contacts 12. This is controlled by proper selection of the value of the resistor 25, or by the use of a zener diode in series with the resistor 25, as is well known in the art. From a consideration of FIGURE 3, it can be appreciated that the limiting characteristic of a fast-acting current limiting circuit such as shown in FIGURE 1, measured with respect to an overload current through the load, can at will be chosen to be faster or slower than a fuse or faster over one part of the characteristic and slower over another, or responsive to completely independent control signals not connected with load current.

FIGURE 4 of the drawings illustrates an embodiment of the invention which is somewhat different than that shown in FIGURE 1. The fast-acting current limiting circuit shown in FIGURE 4 does not include a current interrupter, and a current sensing resistor 41 is inserted in place of the interrupter contacts 12 of the circuit arrangement shown in FIGURE 1. The sensing circuit means comprised by limiting resistor 25 and blocking diode 24 are connected across the load current sensing resistor 41 and to the control gate of the SCR 23. The circuit of FIGURE 4 further differs from the FIGURE 1 circuit arrangement in that a charging resistor 42 is connected in series circuit relationship with the commutating capacitor 16 across the power supply terminals 9 and 10.

In addition to the above differences, the circuit arrangement of FIGURE 4 provides inverse squared current versus time protection in that it includes a pair of series connected resistors 43 and 44 connected in series circuit relationship across the power supply terminals 9 and 10. The juncture of the two series connected resistors 43 and 44 is connected through a second limiting resistor 45 and blocking diode 46 to the control gate of SCR 23. In practice, the resistor 43 is preferably a high negative temperature coefficient resistor, and the resistor 44 is a fixed resistor. Alternatively, the resistor 43 may be a fixed resistor, and the resistor 44 may be a high positive temperature coefficient resistor.

In operation, the commutating capacitor 16 of the circuit arrangement shown in FIGURE 4 will be charged to essentially the potential of the direct current power supply connected across power supply terminals 9 and 10 through resistor 42. This serves the same function, therefore, as the charging arrangement comprised by transformer 18 and rectifier 21 shown in the circuit of FIGURE 1. Ignoring for the time being the inverse squared current versus time protection provided by the elements 43 through 46, it can be seen that the remainder of the circuit will operate in essentially the same manner as the circuit of FIGURE 1 upon the load current through current sensing resistor 41 rising above a predetermined critical level. Upon this occurrence, the sensing circuit means comprised by resistor 25 and diode 24 will fire SCR 23 which will discharge commutating capacitor 16 through the current limiting means 13. In this manner, fast-acting current limiting can be achieved.

In addition to the above protective feature, inverse squared current versus time protection is provided by the resistor networks 43, 44 and the second additional sensing circuit comprised by limiting resistor 45 and diode 46 connected between the juncture of resistors 43 and 44 and the control gate of SCR 23. Whichever of the resistors 43 or 44 is the temperature sensitive resistor, is physically associated in the circuit adjacent the load current sensing resistor 41, and hence is thermally coupled to resistor 41. As a consequence, as the load current sensing resistor 41 heats up due to the load current flowing through it, the resistance characteristics of resistor 43 or 44 will change accordingly in the well-known manner of temperature sensitive resistors. In the particular arrangement of FIGURE 4, the dashed lines through resistor 41 and resistor 43 indicates that resistor 43 is the temperature sensitive resistor, and hence has a high negative temperature coefficient. As a consequence of this arrangement, the resistor 43 will be heated in proportion to the $I^2R$ of load current I flowing through sensing resistor 41. Because resistor 43 has a negative temperature coefficient, its resistance drops, and the voltage across resistor 44 varies with the rising temperature of resistor 43 in the manner shown by curve $v$ in FIGURE 5. The value of the limiting resistor 45 is selected for the particular SCR 23 so as to cause the SCR 23 to fire when the voltage $v$ equals the value $v_1$, and this voltage would in turn represent a selected temperature of the resistor 43. Since resistor 43 is heated in response to $I^2R$ where I is the load current flowing in resistor 41, and R is the fixed resistance value of resistor 41, the tripping characteristic of the overall circuit in response to this part of it would be approximately an inverse current squared versus time characteristic. Conversely, if the resistor 44 is thermally coupled to resistor 41, and has a high positive temperature coefficient, then the voltage across this resistance with rising temperature will be as shown by the curve in FIGURE 6 of the drawings. The main application differences between these two alternate versions of resistors 43 and 44 are shown by the secondary differences in characteristics illustrated in FIGURES 5 and 6, and by the availability of resistors of each type. Accordingly, it can be appreciated that the circuit of FIGURE 4 provides limiting of the load current by a combined response that operates approximately in inverse time relation to the square of the load current with an overriding response to trip almost instantaneously at a selected absolute value of load current. It should be further noted that "almost instantaneously" in electrical control systems conventionally means the inherent speed of the particular device in question without intentional delay. In conventional mechanically actuated interrupter devices, this inherent speed typically is about 15 to 100 milliseconds. In a conventional fuse actuated by load current, it may mean a variable time interval such as is illustrated by the curve $k$ shown in FIGURE 3. In the circuit arrangement of FIGURE 4, it means a fixed time interval determined by the characteristic of the current limiting means 13, and the voltage value of the charge on the commutating capacitor 16. Typically this could be designed and arranged to be upward of 2 or 3 milliseconds for a fuse, or upward of 3 or 4 microseconds for a metallic change of state limiter such as described in the above-identified Hurtle Patent 3,117,203.

FIGURE 7 of the drawings illustrates a version of the invention wherein by the use of two current limiting means, such as the metallic change of state current limiting devices 13 and 49, respectively, and a power diode 48, it is possible to obtain a reduction in the size and rating of the commutating capacitor 16 and the silicon controlled rectifier 23. With the exception of the inclusion of the power diode 48 and the additional metallic change of state limiting device 49, the circuit arrangement of FIGURE 7 is identical to the circuit of FIGURE 1, but operates in a somewhat different manner. In the circuit arrangement of FIGURE 7, the two current limiting devices 13 and 49 carry the rated load current continuously. However, by reason of the connection of the power diode 48, the commutating capacitor 16 discharges only into the current limiting device 13 upon turn on of the SCR 23. SCR 23 turns on of course upon sensing opening of the interrupter contacts 12 as described previously in connection with FIGURE 1 of the drawings. Discharge of commutating capacitor 16 through the current limiting device 13 results in converting 13 to its high resistance condition so that all of the load current then is shunted through the current limiting device 49. This action results in increasing the load current through current limiting device 49 which under such conditions carries current in excess of its continuous rating, and therefore, will convert to its high resistance limiting condition by power from the power supply terminals 9 and 10 alone. From this discussion, it can be appreciated therefore that the commutating capacitor 16 need be only large enough to store sufficient energy to convert the current limiting device 13 (which in the circuit arrangement of FIGURE 7 is half the size of the current limiter device 13 employed in the circuit of FIGURE 1) from its low resistance continuous current rating to its high resistance current limiting condition. Similarly, the SCR 23 employed in the circuit configuration of FIGURE 7 need be only large enough to handle this discharge current in contrast to the larger size SCR required in the circuit arrangement of FIGURE 1.

Figure 8:
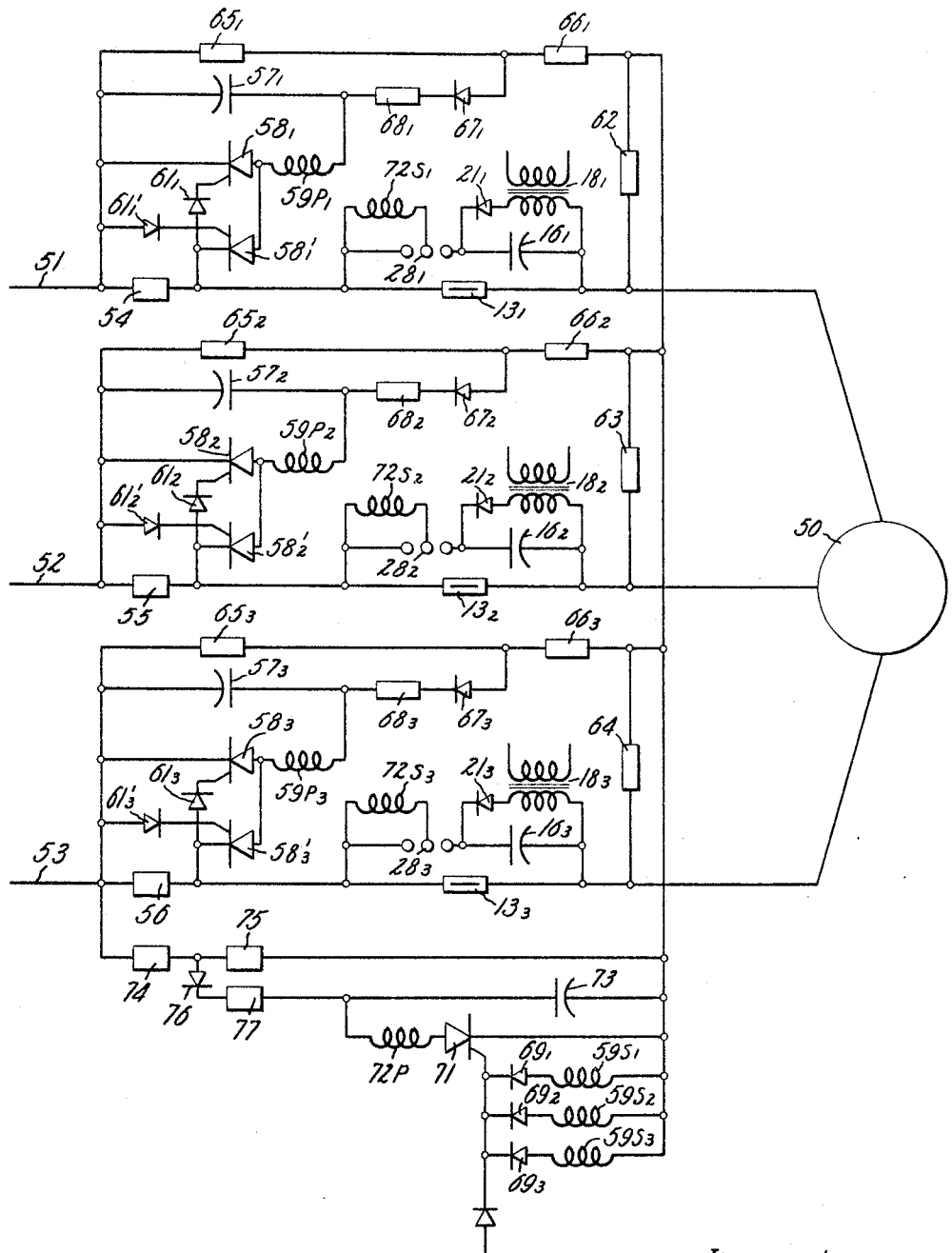
FIGURE 8 is a schematic circuit diagram of a three-phase power circuit constructed in accordance with the invention to provide independent current limiting in each of the separate supply lines as well as current limiting in all lines in response to an overcurrent in any one of the lines.

FIGURE 8 of the drawings illustrates a three-phase circuit employing fast-action current limiting in accordance with the present invention. In FIGURE 8, a three-phase power supply is connected to a three-phase load 50 such as a motor through three power lines 51, 52, and 53. The three-phase power supply is connected to the three-phase load 50 through a respective associated current limiting device $13_1$, $13_2$, or $13_3$ all of which preferably comprise metallic change of state current limiting devices such as disclosed in the Hurtle Patent No. 3,117,203. Each of the current limiting devices $13_1$, $13_2$, and $13_3$ are connected in series circuit relationship with respective associated load current sensing resistors 54, 55, and 56, in the power supply lines 51, 52, and 53, respectively. Since the circuit means associated with each of the current limiting devices $13_1$, $13_2$, and $13_3$ for converting these devices from their low resistance current conducting state to their high resistance current limiting state are identical in construction and operation, only one of these circuits will be described, namely that one associated with the current limiting device $13_1$ and its associated load current sensing resistor 54. Since the other two circuit means associated with the current limiting devices $13_2$ and $13_3$ are identical in construction and operation, all of the elements associated with these circuits have been given the same reference numeral with the appropriate subscript $_2$ or $_3$ to indicate which one of the current limiting devices $13_2$ or $13_3$ they are associated.

In order to convert the current limiting device $13_1$ from its low resistance current conducting state to its high resistance current limiting state, a commutating capacitor $16_1$ and a fast-acting conductivity controlled conducting means comprised by a three-electrode gap $28_1$ are connected in series circuit relationship across the current limiting device $13_1$. The commutating capacitor $16_1$ is charged to a predetermined voltage level by an associated charging circuit means comprised by transformer $18_1$ and rectifier $21_1$. The commutating capacitor $16_1$ after being charged to a predetermined voltage level, is discharged when a gating signal is applied to the control electrode of the three-electrode gap 28 upon the occurence of an overcurrent condition. It should be noted that the control electrode is depicted by the middle electrode of the three-electrode gap illustrated schematically in FIGURE 8.

In order to sense an overcurrent through the load current sensing resistor 54, each load terminal of the sensing resistor 54 is connected through an appropriate blocking diode $61_1$ or $61_1'$ to the gate electrodes of SCR's $58_1$ and $58_1'$, respectively. Each of the SCR's $58_1$ and $58_1'$ is connected in series circuit relationship with the primary winding $59P_1$ of a pulse transformer, and the respective series circuits thus comprised are connected across a first auxiliary commutating capacitor $57_1$. By this arrangement, it doesn't matter during which half cycle of the alternating current potential appearing across the load current sensing resistor 54 that an overcurrent condition occurs, the appropriate diodes $61_1$ or $61_1'$ would turn on their associated SCR $58_1$ or $58_1'$ to discharge the first auxiliary commutating capacitor $57_1$ through the primary winding $59P_1$ of the pulse transformer. Prior to this, however, the first auxiliary commutating capacitor $57_1$ is charged to a predetermined voltage level by a charging network comprised by a pair of voltage dividing resistors $65_1$ and $66_1$ connected across a single phase load resistor 62. The single phase load resistor 62 is connected between the single power supply line 51 and a common neutral point in conjunction with two other single phase load resistors 63 and 64 connected between the same neutral point and the power supply lines 52 and 53. If desired, the load resistors 62, 63 and 64 could be omitted; however, they do serve to stabilize the neutral point during discharge of the commutating capacitors $57_1$, $57_2$ and $57_3$, and hence it is preferred that they be included. The tap-off point of the voltage dividing resistors $65_1$ and $66_1$ is connected through an appropriate rectifying diode $67_1$ and current limiting resistors $68_1$ to charge the first auxiliary commutating capacitor $57_1$.

Upon turn on of either one of the auxiliary SCR's $58_1$ or $59_1'$, a current pulse will be produced in the primary winding $59P_1$ of the pulse transformer due to discharge of the auxiliary commutating capacitor $57_1$. The primary winding $59P_1$ is inductively coupled to a secondary winding $59S_1$ of the pulse transformer which is connected in series circuit relationship with a blocking diode $69_1$ between the control gate of a third auxiliary SCR 71 and the neutral point of the three-phase power supply. The third auxiliary SCR 71 is connected in series circuit relationship with the primary winding 72P of a second pulse transformer across a third auxiliary commutating capacitor 73. The third auxiliary commutating capacitor 73 is charged to a predetermined voltage level by a charging network formed from a pair of voltage dividing resistors 74 and 75 connected from one line of the neutral formed by load resistors 62, 63, and 64. The tap point of the voltage dividing resistors 74 and 75 is connected through a rectifying diode 76 and limiting resistor 77 to charge the third auxiliary commutating capacitor 73 to a predetermined voltage level. The primary winding 72P is connected in series circuit relationship with the third auxiliary SCR 71 across the third auxiliary commutating capacitor 73, and is inductively coupled to three secondary windings $72S_1$, $72S_2$, and $72S_3$ in each of the lines that are connected to the control electrodes of the respective three-electrode gaps $28_1$, $28_2$, and $28_3$.

In operation, upon an overcurrent condition occurring in any one of the load current sensing resistors 54, 55, or 56, the overcurrent condition will be detected by its respective associated SCR $58_1$, $58_1'$, etc. to produce a turn-on current pulse in the associated primary winding $59P_1$, $59P_2$, or $59P_3$. This results in production of a turn-on pulse in the associated secondary windings $59S_1$, $59S_2$, or $59S_3$ which turns on the third auxiliary SCR 71. Upon turn on of the third auxiliary SCR 71, a gating-on pulse will be produced in the primary winding 72P due to the discharge of third auxiliary commutating capacitor 73. This turn on pulse is coupled to all three secondary windings $72S_1$, $72S_2$, and $72S_3$ to thereby gate on all three three-electrode gaps $28_1$, $28_2$, and $28_3$. Upon the three-electrode gaps $28_1$, $28_2$, and $28_3$ being turned on, their associated commutating capacitors $16_1$, $16_2$, $16_3$ will be discharged through the respective current limiting devices $13_1$, $13_2$, $13_3$. In this manner, upon the detection of a fault current in any one of the lines 51, 52, or 53, all three current limiting devices $13_1$, $13_2$, and $13_3$ will be actuated to thereby instantaneously limit current flow in all of the three-phase power supply lines. It should also be noted, that current limiting of all three-phase power supply lines 51, 52, and 53 could be made to respond to an independent control condition other than overcurrent by appropriate connection of the control gate of the third auxiliary SCR 71 to such control signals. Since modification of the circuit of FIGURE 8 to respond to such an independent control signal is believed to be obvious to one skilled in the art, a further description of such modification is believed unnecessary.

Figure 9:
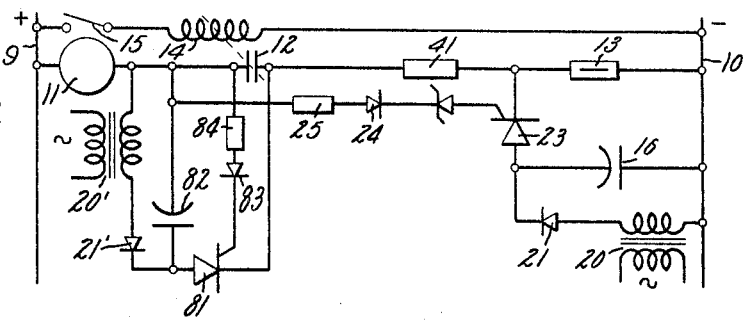
FIGURE 9 is a schematic circuit diagram of a combination fast-acting current limiting and arcless interrupting power circuit constructed in accordance with the present invention.

FIGURE 9 of the drawings illustrates an embodiment of the invention which provides not only fast-acting current limiting, but also arcless interruption of any overcurrent that exists in the circuit being protected. The embodiment of the invention shown in FIGURE 9 is comprised by a load 11, a set of current interrupting physically separable contacts 12, a load current sensing resistor 41, and current limiting means 13 all connected in series circuit relationship across the power supply terminals 9 and 10 which in turn are adapted to be connected to a source of direct current electric potential. A commutating capacitor 16 and gate controlled SCR 23 are connected in series circuit relationship across the current limiting means 13, and a means comprised by transformer 20 and rectifier 21 are connected across the commutating capacitor 16 for charging it to a predetermined voltage level. The control gate of the SCR 23 is connected back through a current sensing circuit comprised by a blocking diode 24 and current limiting resistor 25 across the set of contacts 12 as well as the load current sensing resistor 41. By reason of this arrangement, upon the occurrence of an overcurrent sensed by sensing resistor 41, or upon the opening of contacts 12 giving rise to a voltage across the gating circuit of 23, the circuit will function in the manner previously described in connection with FIGURE 1 of the drawings to provide almost instantaneous current limiting of any over-current in the circuit.

In addition to the above circuitry, the embodiment of the invention shown in FIGURE 9 further includes an arcless current interruption feature which is comprised by a second gate controlled SCR 81 and second commutating capacitor 82 connected in series circuit relationship across the set of current interrupting physically separable contacts 12. The control gate of the second SCR 81 is connected back through a current sensing circuit comprised by blocking diode 83 and current limiting resistor 84 across the set of physically separable contacts 12. The second commutating capacitor 82 is charged to a predetermined voltage level by a source of alternating current coupled through coupling transformer 20' and series connected rectifier 21' to charge the capacitor 82 to a desired voltage level.

By reason of the above arrangement, upon the set of contacts 12 starting to open to interrupt current, the voltage across the contacts increases sufficiently to turn on SCR 81. For certain applications, this can be a very small value in the neighborhood of 3 volts. Upon SCR 81 being turned on, the second commutating capacitor 82 will be discharged through the contacts 12 to substantially suppress any arc that tends to develop across the set of contacts. For a more detailed description of the manner of operation of the arcless interruption circuit, reference is made to copending United States application Serial No. 299,913 filed August 5, 1963 entitled "Arcless Interrupter" by Leon J. Goldberg, inventor, assigned to the General Electric Company, the same assignee as the present invention. From the above description, however, it can be appreciated that the circuit arrangement of FIGURE 9 operates upon the opening of the set of current interrupting physically separable contacts 12 to provide arcless interruption and current limiting, or upon the occurrence of an overcurrent sensed by the overcurrent sensing resistor 41 to instantaneously limit the value of the over-current to levels which would not be injurious to the equipment connected on the line with the current limiting means 13.

Figure 10:
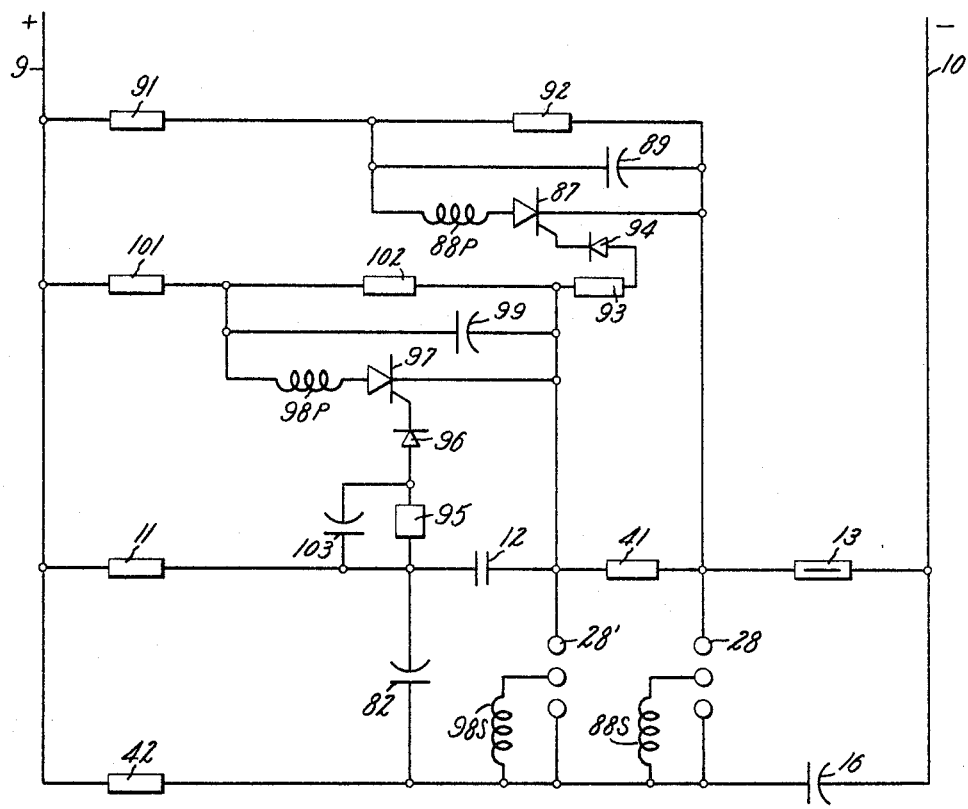
FIGURE 10 is a schematic circuit diagram of a form of combined fast-acting current limiting and arcless interrupting power circuit similar to that shown in FIGURE 9, and suitable for use with high voltages.

FIGURE 10 of the drawings illustrates an embodiment of the invention which is similar to the circuit of FIGURE 9 in that it provides both arcless interruption and instantaneous current limiting, but is designed for use with higher voltages than that for which the circuit of FIGURE 9 is intended. To be specific, while the circuit arrangement of FIGURE 9 would be perfectly suitable for use with power supplies having a voltage rating of 125 volts or so, where the power supply is a 900 volt power supply or larger, the circuit arrangement of FIGURE 10 would be preferred. In the circuit arrangement of FIGURE 10, a load 11, a set of contacts 12, a current sensing resistor 41, and current limiting means 13 are connected in series circuit relationship across the high voltage direct current power supply terminals 9 and 10. A commutating capacitor 16 and first fast-acting conductivity controlled conducting means comprised by a three-electrode gap 28 are connected in series circuit relationship across the current limiting means 13. Similarly, a second commutating capacitor 82 and second fast-acting conductivity controlled conducting means comprised by a second three-electrode gap 28' are connected in series circuit relationship across the set of physically separable contacts 12.

In order to fire the first three-electrode gap 28, a first auxiliary SCR 87 is provided which is connected in series circuit relationship with the primary winding 88P of a pulse transformer whose secondary winding 88S is connected to the control electrode of the three-electrode gap 28. The series connected SCR 87 and primary winding 88P are connected in series circuit relationship across a first auxiliary commutating capacitor 89 which is charged to a desired voltage level from a pair of voltage dividing resistors 91 and 92 through current limiting means 13. The first auxiliary SCR 87 has its control gate connected through a limiting resistor 93 and blocking diode 94 to the load current sensing resistor 41. By this arrangement, upon an overcurrent condition developing in the circuit, the overcurrent is sensed by resistor 41 and fires first auxiliary SCR 87. Upon first auxiliary SCR 87 being gated on, the capacitor 89 discharges through the primary winding 88P of the pulse transformer. This results in the production of a gating-on pulse in the secondary winding 88S which is applied to the control electrode of the three-electrode gap 28. Application of this gating-on pulse to the three-electrode gap 28 causes it to break down and to conduct so that the commutating capacitor 16 is discharged through the current limiting means 13 to give rise to the current limiting action described previously in connection with FIGURE 1 of the drawings.

In a similar manner, the set of physically separable current interrupting contacts 12 is connected through current limiting resistor 95 and blocking diode 96 to the control gate of a second auxiliary SCR 97. The second auxiliary SCR 97 is connected is series circuit relationship with the primary winding 98P of a pulse transformer whose secondary winding 98S is connected to the middle electrode of the three-electrode gap 28'. The SCR 97 and primary winding 98P are connected in series circuit relationship across a second auxiliary commutating capacitor 99 which is charged to a predetermined voltage level from a pair of voltage dividing resistors 101 and 102 connected across the direct current power supply through the load current sensing resistor 41 and current limiting means 13. If desired, a small bypass capacitor 103 may be connected across the voltage limiting resistor 95 to make the firing circuit more sensitive to sudden opening of the contacts 12.

By the above arrangement, upon the set of contacts 12 being opened, the potential appearing across the contacts is sensed by SCR 97 which is gated on. Upon SCR 97 being gated on, commutating capacitor 99 discharges through the primary winding 98P to generate a firing pulse in the secondary winding 98S of the pulse transformer. This results in gating on the three-electrode gap 28' and allows the commutating capacitor 82 to discharge through the set of physically separable contacts 12 to extinguish any arc that might tend to occur across these contacts as they open. From this description, it can be appreciated that the circuit of FIGURE 10 operates in much the same manner of FIGURE 9, but by reason of its particular design, it is better adapted for use with high voltage direct current power supplys on the order of 900 volts or larger. Also, it should be noted that in the circuit arrangement of FIGURE 9, fast current limiting action is initiated either by overcurrent in sensing resistor or opening of contacts 12. In the circuit of FIGURE 10 fast current limiting action is initiated only by overcurrent through sensing resistor 41. The choice is optional for by proper design either circuit can be made responsive to either phenomenon, or for that matter any other undesired condition to be protected against. A further essential difference to be noted between the two circuits shown in FIGURES 9 and 10 is that in the lower voltage circuit of FIGURE 9, the SCR's are used to both sense the undesired load current condition and discharge the commutating capacitors through the current limiting device or arcless contacts. In the higher voltage FIGURE 10 circuit, the SCR's only sense the undesired load current condition, and then trigger the less sensitive three-electrode gaps which have a higher voltage capability. The three-electrode gaps then discharge the commutating capacitors.

Figure 11:
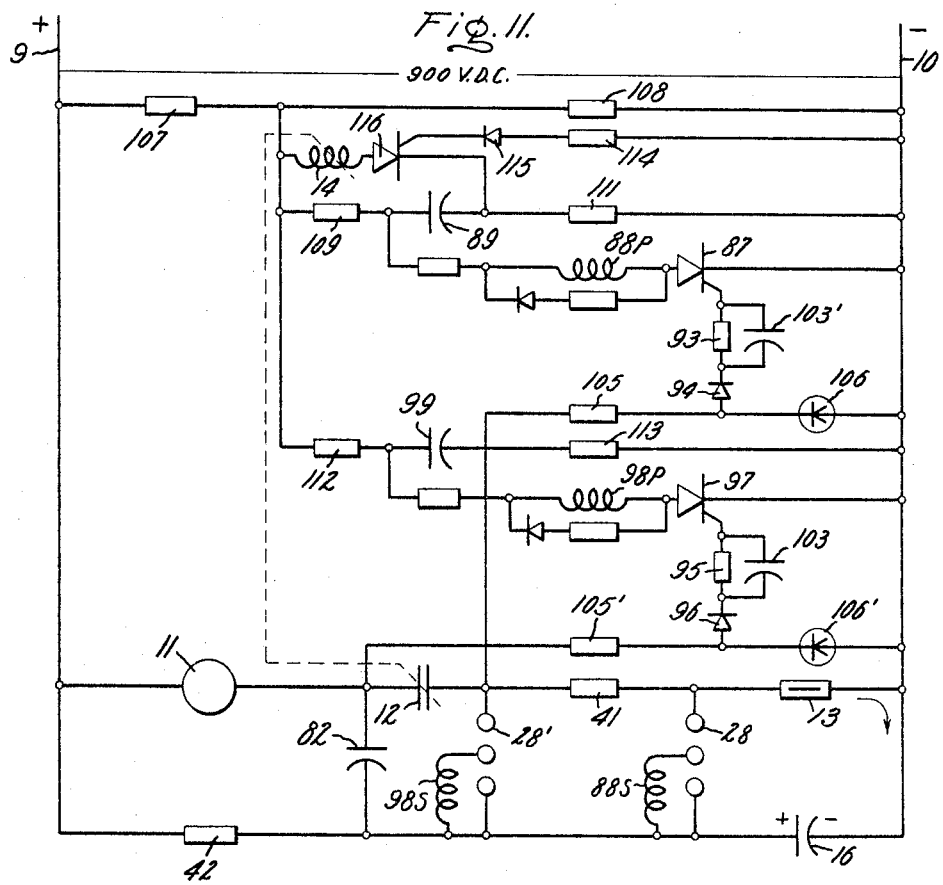
FIGURE 11 is a schematic circuit diagram of the form of circuit shown in FIGURE 10 complete with the details of over-current protection, and an improved trigger circuit for initiating arcless interruption.

FIGURE 11 of the drawings illustrates a combined fast-acting current limiting and arcless interrupting circuit which is entirely similar to the circuit of FIGURE 10 in construction and operation with the exception that certain protective circuit features are added as well as the interconnection to provide for automatic arcless interruption upon the fast-acting current limiting branch of the circuit being actuated. Because of its great similarity to the circuit of FIGURE 10, only the circuit differences of the circuit arrangement of FIGURE 11 will be described. In the circuit of FIGURE 11, the sensing circuit arrangement connected to the control gate of the first auxiliary SCR 87 is comprised by a blocking diode 94 and current limiting resistor 93, and is connected to a voltage divider comprised by a series connected resistor 105 and zener diode 106. Similarly, the second auxiliary SCR 97 has its control gate connected through limiting resistor 95 and blocking diode 96 to the junction of a voltage divider comprised by a limiting resistor 105' and series connected zener diode 106'. By this arrangement, upon the gating voltage applied to either of the auxiliary SCR's 87 or 97 reaching a predetermined firing potential, the zener diodes 106 or 106' will break down and conduct, thus clamping the gating electrodes of these SCR's to a limited potential much below the voltage level which would result in damage to the gate electrode of the SCR's.

In addition to the above differences, the two auxiliary commutating capacitors 89 and 99 are each connected to a common voltage dividing network comprised by a pair of series connected resistors 107 and 108. The first auxiliary commutating capacitor 89 is connected in series circuit relationship with a pair of limiting resistors 109 and 111 between the juncture of the two voltage dividing resistors 107 and 108 and the power supply terminal 10. Similarly, the second auxiliary commutating capacitor 99 is connected in series circuit relationship with a pair of limiting resistors 112 and 113 between the juncture of the voltage dividing resistors 107 and 108 and the power supply terminal 10. The inclusion of the limiting resistor 111 connected in this manner will give rise to a positive gating pulse appearing across resistor 111 upon the fast-acting current limiting circuit portion being actuated at the time that the first auxiliary SCR 87 is turned on. This positive gating pulse is supplied back through a current limiting resistor 114 and blocking diode 115 to the gate electrode of a SCR 116. The SCR 116 is connected in series circuit relationship with trip winding 14 of the solenoid actuated current interrupting physically separable contacts 12. By this arrangement then, upon SCR 116 being turned on the solenoid tripped physically separable contacts 12 will be opened thereby assuring sequential actuation of the arcless interrupter subsequent to the current limiting operation. In this manner, it is assured that arcless interruption is interconnected with the fast-acting current limiting in such a manner as to assure interruption of load current flow after initial limitation by the fast-acting current limiting means 13.

It should be noted that in the circuit arrangement of FIGURE 11, the commutating capacitor 16 is charged with the polarity such that upon its discharge, the discharge current flows through the current limiting means 13 in the same direction as the load current. As a result the discharge current adds to the load current thereby facilitating switching the current limiting means 13 to its high resistance limiting condition.

Figure 12:
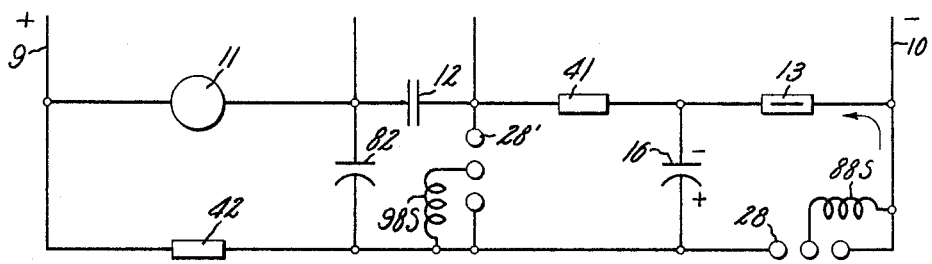
FIGURE 12 illustrates an alternative form for the circuit of FIGURE 11 wherein improved limiting action can be obtained in a faster manner.

FIGURE 12 of the drawings illustrates an alternative arrangement to that shown in FIGURE 11 wherein the commutating capacitor 16 is charged with a polarity such that its discharge current (upon the three-electrode gap 28 being gated on) flows in opposition to the normal load current. By effecting this change, the normal load current flowing through the limiting means 13 is quickly driven to zero by the opposing discharge current from commutating capacitor 16. This results in forcing the current through the limiting means 13 to reverse which aids in achieving a high voltage hold-off ability. It should be further noted that while the modified circuit arrangement of FIGURE 12 has been described with relation to the circuit shown in FIGURE 11 of the drawings, a similar modification could be made to other of the circuits herein disclosed to achieve a commutating discharge current flow in opposition to the normal load current flow. Since such modifications are deemed obvious to one skilled in the art in the light of the present disclosure, a further description thereof is not believed to be necessary.

Figure 13:
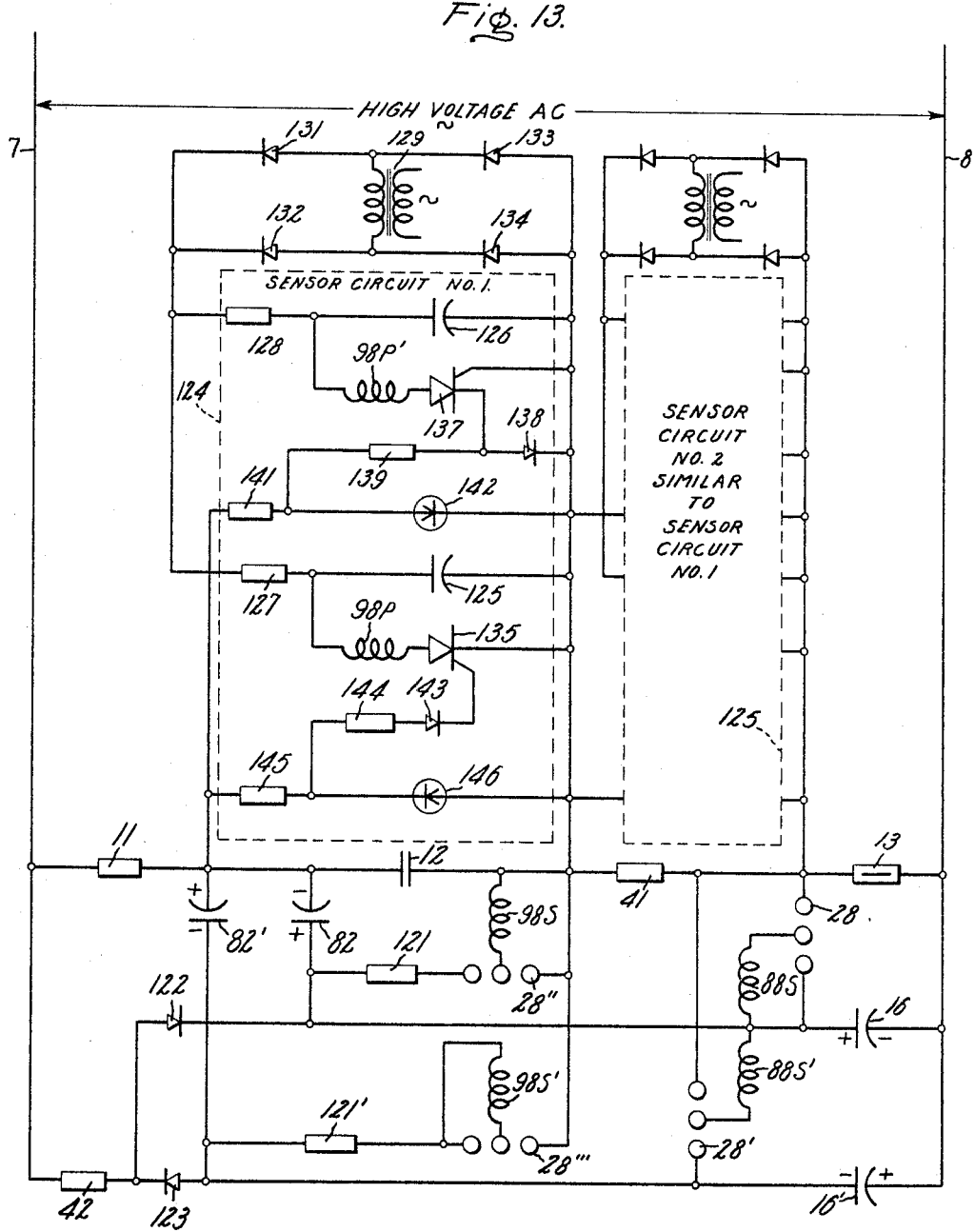
FIGURE 13 illustrates an embodiment of the fast-acting current limiting and arcless interruption circuit adapted for use with alternating current.

FIGURE 13 of the drawings illustrates an alternating current version of a combined fast-action current limiting and arcless interruption circuit which is constructed in accordance with the present invention, and which is adapted for use with high voltage alternating currents. In FIGURE 13, a load 11, a set of current interrupting physically separable contacts 12, a load current sensing resistor 41, and current limiting means 13 are connected in series circuit relationship across a pair of power supply terminals 7 and 8 that in turn are adapted to be connected across a source of high voltage alternating current electric potential. A first commutating capacitor 16 and three-electrode gap 28 are connected in series circuit relationship across the current limiting means 13, and a second commutating capacitor 16' and three-electrode gap 28' are connected in series circuit relationship across the current limiting means 13 in parallel circuit relationship with the first commutating capacitor 16 and series connected three-electrode gap 28. Similarly, a third commutating capacitor 82 and three-electrode gap 28" are connected in series circuit relationship with a limiting resistor 121 across the set of physically separable current interrupting contacts 12, and a fourth commutating capacitor 82' and a fourth three-terminal gap 28'" are connected in series circuit relationship with a current limiting resistor 121' across the set of contacts 12 in parallel circuit relationship with the commutating capacitor 82, three-electrode gap 28", and limiting resistor 121. The two commutating capacitors 16 and 82 are charged to a predetermined voltage level having the polarities indicated through a rectifying diode 122 and series connected limiting resistor 42, and the two commutating capacitors 16' and 82' are charged to a similar predetermined voltage level having the reverse polarity of the commutating capacitors 16 and 82 as indicated through a rectifying diode 123 and current limiting resistor 42.

The three-electrode gaps 28" and 28'" associated with the set of physically separable interrupter contacts 12, and the three-electrode gaps 28 and 28' associated with the current limiting means 13 are actuated by individual sensor circuits illustrated in the dotted outline boxes 124 and 125, respectively. Because the two individual sensor circuits are identical in construction and operate in the same manner, only the sensor circuit 124 associated with the set of physically separable current interrupting contacts 12 will be described in detail. It is to be understood, however, that the sensor circuit 125 associated with the current limiting means 13 is identical in construction and will operate in the same manner to initiate conduction through either of the three-electrode gaps 28 or 28′ to thereby provide almost instantaneous current limiting by discharge of the respective commutating capacitors 16 or 16′ through the current limiting means 13 to thereby initiate its current limiting action.

The sensor circuit 124 connected across the set of physically separable current interrupting contacts 12 is comprised by a pair of auxiliary commutating capacitors 125 and 126 which are connected in series circuit relationship with current limiting resistors 127 and 128, respectively, across a direct current power supply. This direct current power supply is comprised by an alternating current transformer 129 and a rectifying bridge comprised by diode rectifiers 131, 132, 133, and 134. By this arrangement, the rectifying bridge and alternating current transformer 129 will serve to charge the auxiliary commutating capacitors 125 and 126 to predetermined voltage levels. Connected across the commutating capacitor 125 is a series circuit comprised by an auxiliary SCR 135 and series connected primary winding of a pulse transformer 98P which is inductively coupled to the secondary winding 98S connected to the control electrode gap of three-electrode gap 28″. Similarly, a series circuit comprised by an auxiliary SCR 137 and series connected primary winding 98P′ is connected across the commutating capacitor 126. The primary winding 98P′ is inductively coupled to a secondary winding 98S′ which is connected to the control electrode of three-electrode gap 28‴ for discharging capacitor 82′ and the primary winding 98P is inductively coupled to a secondary winding 98S which is connected to the control electrode of three-electrode gap 28″ for discharging capacitor 82.

The control gate of auxiliary SCR 137 is connected directly to the negative terminal of the direct current power supply provided by rectifying network 131 through 134, and this is in turn connected to one of the physically separable contacts 12. The collector electrode of SCR 137 is connected to the juncture of series circuit comprised by a blocking diode 138 and limiting resistor 139. The series circuit comprised by diode 138 and resistor 139 is connected to the juncture of a voltage dividing network comprised by a resistor 141 and zener diode 142 connected in series circuit relationship across the contacts 12. The gating electrode of the auxiliary SCR 135 is connected through a blocking diode 143 and limiting resistor 144 to the juncture of a second voltage dividing network comprised by a limiting resistor 145 and zener diode 146 connected in series circuit relationship across the set of physically separable contacts 12.

By the above arrangement, depending upon which half-cycle of the alternating current supply potential that an over-current condition is detected, or that it is desired to interrupt current flow through the set of contacts 12, a positive gating potential will be applied to the gating electrode of either SCR 135 or SCR 137. For example, if at the particular instant of interruption, the power supply terminal 8 is positive with respect to the power supply terminal 7, then the SCR 137 will be gated on to provide arcless interruption. Conversely, if at the instant of desired interruption the power supply terminal 7 is positive with respect to the power supply terminal 8, then a positive gating signal will be applied to the gate of the auxiliary SCR 135 to provide arcless interruption. If SCR 137 is turned on to provide arcless interruption, a gating-on pulse will be induced in the secondary winding 98S′ inductively coupled to primary winding 98P′ which is connected in series circuit relationship with auxiliary SCR 137. This gating-on pulse is applied to the control electrode of three-electrode gap 28‴ to fire the three-electrode gap 28‴ and thereby provide for discharge of the commutating capacitor 82′ across the separating contacts 12 to extinguish any arc that tends to form thereacross. Conversely, if it is the SCR 135 which is fired, a gating-on pulse will be induced in the secondary winding 98S to thereby turn on three-electrode gap 28″. This causes discharge of the commutating capacitor 82 across the physically separable contacts 12 to thereby extinguish any arc which might tend to form across the contacts. In a similar manner, sensor circuit number 2 will cause turn on of the gaps 28 or 28′ to provide for fast-action current limiting through the current limiting means 13 during alternate half cycles of the applied alternating current potential across power supply terminals 7 and 8.

FIGURE 14 of the drawings illustrates a modification of the single phase direct current circuits illustrated and described with relation to FIGURES 1, 4, 7, and 9–12 of the drawings. In the embodiment of the invention shown in FIGURE 14, the distributed capacitance of a cable depicted by a plurality of parallel connected capacitors 151 and interconnected series inductances 152 is employed as the commutating capacitor 16 used in the circuit arrangements listed. The commutating capacitors 151 are connected in series circuit relationship with the conductivity controlled conducting means 17 which may comprise one of the devices shown in FIGURE 2 of the drawings, and the series circuit thus comprised is connected across the load terminals of a current limiting means 13. The current limiting means is connected in series circuit relationship with a sensing resistor 141 and a load 11 through the cable whose distributed capacitance 151 is employed as the commutating capacitor. The sensing resistor 41 is connected to the control gate or other turn-on means of the conductivity controlled conducting means 17 through the limiting resistor 25 and blocking diode 24.

In operation, the circuit of FIGURE 14 will operate to discharge the capacitance illustrated by capacitors 151 through the gate controlled conductivity controlled conducting means 17 into the limiting means 13 to achieve almost instantaneous limiting action by the limiting means 13 upon an overcurrent condition being sensed by resistor 41. Hence, it can be appreciated that the circuit arrangement of FIGURE 14 operates in the same manner of FIGURES 1 and 4, for example, with the exception that the distributed capacitance of the cable is employed as the commutating capacitor of the circuit.

FIGURE 15 of the drawings illustrates an alternating current-direct current systems using the fast-action current limiting circuit constructed in accordance with the invention, and which employs the distributed capacitance of the cables interconnecting the load 11 with the output of a three-phase rectifier bridge 154. The three-phase rectifier bridge 154 is connected across a load 11 through a pair of power cables, and a current limiting means 13 and sensing resistor 41 connected in series circuit relationship with the load 11. The distributed capacitance of one of the power cables represented by capacitor 155 is connected in series circuit relationship with a gate controlled SCR 157 and a limiting resistor 158, and the series circuit thus comprised is connected across the limiting means 13. The distributed capacitance of the remaining cable represented by capacitor 156 is not employed but for convenience and safety, the outer sheath of the cable is grounded so as to in effect ground the center tap point of the distributed capacitances of the two cables in the manner indicated.

In order to turn on the gate controlled SCR 157, the sensing resistor 41 has a voltage dividing network comprised by a resistor 161 and zener diode 162 connected in series circuit relationship across it and the current limiting means 13. The juncture of the zener diode 162 and limiting resistor 161 is connected through a limiting resistor 163 and parallel connected capacitor 164, a second limiting resistor 165 and blocking diode 166 to the control gate of an auxiliary gating-on SCR 167. The auxiliary gating-on SCR 167 is connected in series circuit relationship with the primary winding 168P of a pulse transformer whose secondary winding 168S is connected to the control gate of the SCR 157. The series circuit comprised by the auxiliary SCR 167 and primary winding 168P is connected across a second commutating capacitor 169 which is charged from an alternating current transformer 20 and diode rectifier 21 through a limiting resistor 171.

By the above arrangement, upon an overcurrent being sensed by the resistor 41, the auxiliary SCR 167 is turned on to discharge auxiliary commutating capacitor 169 through the primary winding 168P of the pulse transformer. This results in the production of a gating-on pulse in the secondary winding 168S which turns on SCR 157. Upon SCR 157 being turned on, the distributed capacitance of the cable connected to load 11 represented by capacitor 155 is discharged through limiting resistor 158 and SCR 157 to the current limiting means 13 to thereby convert it to its high resistance limiting condition. It can be appreciated therefore that the circuit arrangement of FIGURE 15 operates in the same manner as a single phase circuit arrangement of FIGURE 14 to provide fast-acting current limiting through the use of the distributed capacitance of a cable employed as a part of the circuit.

From the foregoing description, it can be appreciated that the present invent provides a whole family of new and improved fast-action current limiting circuits. These circuits can be used in combination with conventional circuit interrupters as well as arcless interrupters, and are capable of detecting, signaling, and limiting fault currents in a circuit before they develop high damage capability, as well as to interrupt such fault currents. Further, it can be appreciated that all of these circuits are capable of repetitive operation over an extensive useful life period provided a current limiting means such as a metallic change of state limiting device or a "PTC" resistor is employed in the circuit arrangements. Further, it can be appreciated that where one shot devices such as a fusible link is employed in the circuit, fast-action current interruption is provided. Further, the circuits may be employed in either alternating current or direct current circuits having commercial power ratings especially those of substantial size and higher voltages. In addition, the circuits can be employed in a polyphase line to provide over-all circuit protection of a nature which limits current in all of the lines of the polyphase supply upon the occurrence of a fault in one of the lines, and if desired, can be made responsive to some extraneous control to thereby limit current throughout the polyphase system.

Having described several embodiments of the new and improved fast-action current limiting circuit and fast-action current limiting and interruption circuits constructed in accordance with the invention, it is believed obvious that other modifications and variations of the present invention are possible in light of the above teachings. It is therefore to be understood that changes may be made in particular embodiments of the invention described which are within the full intended scope of the invention as defined by the appended claims.

What I claim as new and desire to secure by Letters Patent of the United States is:

1. A fast-action current limiting circuit including in combination a load to be protected and current limiting means connected in series circuit relationship across a pair of power supply terminals that in turn are adapted to be connected across a source of electric potential, a commutating capacitor and fast-acting conductivity controlled conducting means connected in series circuit relationship across said current limiting means, said commutating capacitor having its primary discharge path through said current limiting means upon said fast acting controlled conducting means being turned on to thereby initiate current limiting action by said current limiting means, means for charging the commutating capacitor to a predetermined voltage level, sensing means operatively connected in circuit relationship with the load for sensing load current flow through the load and deriving an output gating signal upon the load current assuming an undesired load current condition, and means operatively coupling the output of said sensing means to the fast-acting conductivity controlled conducting means for causing the fast-acting conducting means to turn on thereby discharging the commutating capacitor through the current limiting means to initiate its current limiting action.

2. The combination set forth in claim 1 wherein the current limiting means comprises a fusible element which both limits and interrupts current flow through the circuit.

3. The combination set forth in claim 1 wherein said fast-acting conductivity controlled conducting means comprises a fast-acting gate controlled conducting means and the output of the sensing means is operatively coupled to the control gate of the fast-acting gate controlled conducting means.

4. The combination set forth in claim 1 wherein the fast-acting conductivity controlled conducting means comprises a fast-acting, high sensitivity gate controlled conducting device having its control gate operatively coupled to the sensing means and a less sensitive high voltage fast-acting conductivity controlled conducting device operatively coupled to discharge the commutating capacitor through the current limiting means and triggered by the gate controlled conducting device.

5. The combination set forth in claim 1 wherein the fast-acting conductivity controlled conducting means and the commutating capacitor are arranged relative to the current limiting means in such a manner that current discharged from the commutating capacitor through the current limiting means flows in the same direction as the load current.

6. The combination set forth in claim 1 wherein the fast-acting conductivity controlled conducting means and the commutating capacitor are arranged relative to the current limiting means in such a manner that current discharged from the commutating capacitor through the current limiting means flows in opposition to the load current.

7. The combination set forth in claim 1 wherein said fast-acting conductivity controlled conducting means is a silicon controlled rectifier having its control gate operatively coupled to the output of the sensing means.

8. The combination set forth in claim 1 wherein the fast-acting conductivity controlled conducting means comprises a silicon controlled rectifier and a three-electrode gap having its control electrode operatively triggered by the silicon controlled rectifier.

9. A fast-action current limiting circuit including in combination a load to be protected, a set of current interrupting physically separable contacts, and current limiting means connected in series circuit relationship across a pair of power supply terminals that in turn are adapted to be connected across a source of electric potential, a commutating capacitor and fast-acting conductivity controlled conducting means connected in series circuit relationship across the current limiting means, said commutating capacitor having its primary discharge path through said current limiting means upon said fast acting controlled conducting means being turned on to thereby initiate current limiting action by said current limiting means, means for charging the commutating capacitor to a predetermined voltage level, sensing means operatively connected across the current interrupting physically separable contacts for sensing an increase in voltage thereacross and deriving an output gating signal in response to the increase in voltage, and means operatively coupling the output of said sensing means to the fast-acting conductivity controlled conducting means for causing the fast-acting conducting means to turn on thereby discharging the commutating capacitor through the current limiting means to initiate the current limiting action.

10. A fast-action current limiting circuit including in combination a load to be protected, a load current sensing resistor, and current limiting means connected in series circuit relationship across a pair of power supply terminals that in turn are adapted to be connected across a source of electric potential, a commutating capacitor and fast-acting conductivity controlled conducting means connected in series circuit relationship across the current limiting means, means for charging the commutating capacitor to a predetermined voltage level, first gating circuit means operatively coupled to said load current sensing resistor, and to the fast-acting conductivity controlled conducting means for causing the fast-acting conductivity controlled conducting means to turn on thereby discharging the commutating capacitor through the current limiting means to initiate its current limiting action, second gating circuit means operatively coupled to said conductivity controlled conducting means, a temperature sensitive firing voltage deriving network operatively coupled to said second gating circuit means for turning on the fast-acting conductivity controlled conducting means in response to the inverse square value of the load current, said temperature sensitive firing voltage deriving network including a temperature sensitive resistor physically juxtaposed to the load current sensing resistor and having its resistance value determined primarily by the heating value of the load current flowing through said load current sensing resistor.

11. A fast-action current limiting circuit including in combination a load to be protected and first current limiting means connected in series circuit relationship across a pair of power supply terminals that in turn are adapted to be connected across a source of electric potential, second current limiting means and a blocking diode connected in parallel circuit relationship with said first current limiting means, a commutating capacitor and fast-acting conductivity controlled conducting means connected in series circuit relationship across the parallel connected first current limiting means and second current limiting means and series connected blocking diode, means for charging the commutating capacitor to a predetermined voltage level, sensing means operatively connected in circuit relationship with the load for sensing load current flow through the load and deriving an output gating signal upon the load current assuming an undesired load current condition, and means operatively coupling the output of said sensing means to the fast-acting conductivity controlled conducting means for causing the fast-acting conducting means to turn on thereby discharging the commutating capacitor through the first current limiting means to initiate its current limiting action.

12. A fast-action current limiting circuit for a three-phase power supply including in combination a three-phase load to be protected, individual current limiting means connected in series circuit relationship in each single phase power supply line with the three-phase load, a commutating capacitor and fast-acting conductivity controlled conducting means connected in series circuit relationship across the current limiting means in each of the three single phase power supply lines, each of said commutating capacitors having its primary discharge path through its associated current limiting means upon the fast acting controlled conducting means therefor being turned on, means for charging each of the commutating capacitors to a predetermined voltage level, sensing means operatively connected in series circuit relationship with the load and current limiting means in each of the single phase power supply lines for sensing load current flow and deriving an output gating signal upon the load current in any one of the phase assuming an undesired load current condition, and means operatively coupling the output of all of said sensing means to all of the fast-acting conductivity controlled conducting means for causing the fast-acting conducting means to turn on thereby discharging their respective associated commutating capacitors through their respective associated current limiting means to initiate their current limiting action upon the occurrence of an undesired load current condition in any one of the single phase power supply lines.

13. A fast-action current limiting circuit for a three-phase power supply including in combination a three-phase load to be protected, current limiting means connected in series circuit relationship in each single phase power supply line with the three-phase load, a commutating capacitor and a fast-acting gate controlled conducting means connected in series circuit relationship across each current limiting means in each of the three single phase power supply lines, each of said commutating capacitors having its primary discharge path through its associated current limiting means upon the fast acting controlled conducting means therefor being turned on, means for charging each of the commutating capacitors to a predetermined voltage level, load current sensing means operatively connected in series circuit relationship with the current limiting means in each of the three single phase power supply lines for sensing load current flow through the three-phase load and deriving an output gating signal upon the load current assuming an undesired load current condition, pulsing means comprising an auxiliary fast-acting gate controlled conducting means connected in series circuit relationship with the primary winding of a pulse transformer across one of the single phase power supply lines of the three-phase power supply, the pulse transformer having three separate secondary windings with each secondary winding being operatively connected to the control gate of one of the fast-acting gate controlled conducting means connected in respective ones of the single phase lines of the three-phase power supply, and additional coupling means operatively coupling the output of the individual sensing means in each of the three single phase power supply lines to the control gate of the auxiliary fast-acting gate controlled conducting means for causing the auxiliary fast-acting gate controlled conducting means to turn on thereby turning on the three fast-acting gate controlled conducting means connected in each of the three single phase power supply lines and hence discharging the commutating capacitors through the current limiting means in each of the three single phase power supply lines to initiate their current limiting action.

14. A fast-action current limiting and interrupting circuit including in combination a load to be protected, a set of current interrupting physically separable contacts, and current limiting means connected in series circuit relationship across a pair of power supply terminals that in turn are adapted to be connected across a source of electric potential, respective commutating capacitors and fast-acting conductivity controlled conducting means connected in series circuit relationship across said set of current interrupting physically separable contacts and said current limiting means, respectively, the commutating capacitors having their primary discharge path through said current limiting means and said physically separable contacts, respectively, upon the fast acting controlled conducting means therefor being turned on, means for charging each of the commutating capacitors to a predetermined voltage level, sensing means operatively connected in series circuit relationship with the load for sensing the load current and deriving an output gating signal upon the load current assuming an undesired load current condition, and means operatively coupling the output of said sensing means to each of the fast-acting conductivity controlled conducting means for causing the fast-acting conductivity controlled conducting means to turn on thereby discharging their associated commutating capacitors through the current interrupting physically separable set of contacts and the current limiting means, respectively, to thereby initiate their interrupting and current limiting action.

15. The combination set forth in claim 14 wherein the fast-acting conductivity controlled conducting means each comprise fast-acting gate controlled conducting means, and wherein the output of the sensing means is operatively coupled to the control gate of each of the fast-acting gate controlled conducting means.

16. The combination set forth in claim 14 wherein the fast-acting conductivity controlled conducting means comprises a gate controlled silicon controlled rectifier having its control gate operatively coupled to the output of the sensing means, and wherein the current limiting means comprises a metallic change of state current limiting device.

17. The combination set forth in claim 14 wherein the fast-acting conductivity controlled conducting means comprises a three-electrode gap having its control electrode connected to the output of the sensing means, and wherein the current limiting means comprises a metallic change of state current limiting device.

18. A fast-action current limiting and interrupting circuit including in combination a load to be protected, a set of current interrupting physically separable contacts, and current limiting means connected in series circuit relationship across a pair of power supply terminals that in turn are adapted to be connected across a source of electric potential, a respective associated commutating capacitor and fast-acting gate controlled silicon controlled rectifier device connected in series circuit relationship across each of said current limiting means and said set of current interrupting physically separable contacts, said commutating capacitors having their primary discharge path through said current limiting means and said physically separable contacts, respectively, upon the fast acting silicon controlled rectifier therefor being turned on, means for charging each of the commutating capacitors to a predetermined voltage level, a series connected limiting resistor and blocking diode sensing circuit means operatively connected across the set of current interrupting physically separable contacts and to the control gate of the gate controlled silicon controlled rectifier device associated therewith, a load current sensing resistor operatively connected in series circuit relationship with the load, the set of physically separable contacts, and the current limiting means, and a current limiting resistor and series connected blocking diode operatively connected across said load current sensing resistor and to the control gate of the remaining gate controlled silicon controlled rectifier device associated with the current limiting means.

19. A fast-action current limiting and interrupting circuit including in combination a load to be protected, a set of current interrupting physically separable contacts, a load current sensing resistor, and current limiting means all connected in series circuit relationship across a pair of power supply terminals that in turn are adapted to be connected across a source of electric potential, a respective commutating capacitor and a three electrode gap connected in series circuit relationship across each of said current limiting means and said set of current interrupting physically separable contacts, respectively, said commutating capacitors having their primary discharge path through said current limiting means and said physically separable contacts, respectively, upon the fast acting three electrode gap therefor being turned on, means for charging each of the commutating capacitors to a predetermined voltage level, a first pulsing network comprising a first gate controlled silicon controlled rectifier and the primary winding of a first pulse transformer operatively connected in series circuit relationship across a source of electric potential lower in value than the electric potential applied across the load circuit, the secondary winding of the first pulse transformer being connected to the control electrode of the three-electrode gap operatively coupled across the current limiting means, and the control gate of the first silicon controlled rectifier device being operatively connected to the load current sensing resistor, a second pulsing network comprising a second gate control silicon controlled rectifier and the primary winding of a second pulse transformer operatively connected in series circuit relationship across a source of electric potential lower in value than the electric potential supplied across the load circuit, the secondary winding of the second pulse transformer being operatively connected to the control electrode of the three-electrode gap operatively connected across the set of current interrupting physically separable contacts, and the control gate of the second silicon controlled rectifier device being operatively coupled across the set of current interrupting physically separable contacts for sensing the opening of these contacts.

20. The combination set forth in claim 19 wherein the series connected commutating capacitor and three-electrode gap connected in series circuit relationship across the current limiting means are arranged with respect to the polarity of the power supply terminals in a manner such that the discharge current from the commutating capacitor flows through the current limiting means in the same direction as the load current.

21. The combination set forth in claim 19 wherein the commutating capacitor and three-electrode gap connected in series circuit relationship across the current limiting means are arranged with respect to the polarity of the power supply terminals in a manner such that the discharge current of the commutating capacitor flows in opposition to the load current flow through the current limiting means.

22. A fast-action current limiting circuit for alternating current circuits including in combination a load to be protected and current limiting means connected in series circuit relationship across a pair of alternating current power supply terminals, a first commutating capacitor and first fast-acting conductivity controlled conducting means connected in series circuit relationship across the current limiting means, a second commutating capacitor and second fast-acting conductivity controlled conducting means connected in series circuit relationship across the said current limiting means, each of said commutating capacitors having their primary discharge paths through said current limiting means upon the fast acting conductively controlled conducting means therefor being turned on, means for charging the first commutating capacitor to a predetermined voltage level having one polarity, means for charging the second commutating capacitor to a predetermined voltage level having an opposite polarity, sensing means operatively connected in series circuit relationship with the load for sensing load current flow and deriving an output gating signal upon the load current assuming an undesired load current condition, and means operatively coupling the output of said sensing means to respective ones of said fast-acting conductivity controlled conducting means to cause the fast-acting conductivity controlled conducting means to turn on thereby discharging their respective associated commutating capacitors through the current limiting means to initiate its current limiting action.

23. A fast-action current limiting and interrupting circuit for alternating current circuits including in combination a load to be protected, a set of current interrupting physically separable contacts, a load current sensing resistor, and current limiting means all connected in series circuit relationship across a pair of alternating current power supply terminals, a respective commutating capacitor and a fast-acting gate controlled conducting device connected in series circuit relationship across each of said sets of current interrupting physically separable contacts and said current limiting means, respectively, each of said commutating capacitors having their primary discharge paths through said current limiting means and said physically separable contacts upon the fast acting gate controlled device therefor being turned on, means for charging the commutating capacitor in each set to predetermined voltage levels having opposite polarities, first and second sensing circuit means, said first sensing circuit means being opertaively connected across the set of current interrupting physically separable contacts, and the second sensing circuit means being operatively connected across the load current sensing resistor, said first and second sensing circuit means comprising first and second auxiliary gate controlled conducting means connected in series circuit relationship with the primary winding of a respective pulse transformer across a source of energizing potential with the control gates of the auxiliary fast-acting gate controlled conducting means being operatively connected across said set of current interrupting physically separable contacts and said load current sensing resistor, respectively, the secondary windings of the pulse transformer of the first sensing circuit means being operatively connected to the control gate of the fast-acting gate controlled conducting means operatively connected across the set of current interrupting physically separable contacts, and the secondary windings of the the pulse transformer of the first sensing icrcuit means being operatively coupled to the control gate of the fast-acting gate controlled conducting means operatively connected across the current limiting means.

24. The combination set forth in claim 1 wherein the commutating capacitor comprises the distributed capacitance of a cable.

References Cited by the Examiner

UNITED STATES PATENTS

| | | |
|---|---|---|
| 2,789,253 | 4/1957 | Vang. |
| 2,849,659 | 8/1958 | Kesselring. |
| 3,042,838 | 7/1962 | Bedford et al. |
| 3,098,949 | 7/1963 | Goldberg. |
| 3,117,203 | 1/1964 | Hurtle _____ 317—113.2 X |
| 3,158,786 | 11/1964 | Hurtle. |
| 3,198,989 | 8/1965 | Mahoney. |

MAX L. LEVY, *Primary Examiner.*

SAMUEL BERNSTEIN, MILTON O. HIRSHFIELD, *Examiners.*

R. V. LUPO, *Assistant Examiner.*